(12) United States Patent
Mülleder

(10) Patent No.: US 8,939,761 B2
(45) Date of Patent: Jan. 27, 2015

(54) PROCESS AND DEVICE FOR THE PURIFICATION OF WASTE GASES

(71) Applicant: Chemisch Thermische Prozesstechnik GmbH, Graz (AT)

(72) Inventor: Christian Mülleder, Grambach (AT)

(73) Assignee: Chemisch Thermische Prozesstechnik GmbH, Graz (AT)

( * ) Notice: Subject to any disclaimer, the term of this patent is extended or adjusted under 35 U.S.C. 154(b) by 0 days.

(21) Appl. No.: 14/167,422

(22) Filed: Jan. 29, 2014

(65) Prior Publication Data
US 2014/0212349 A1    Jul. 31, 2014

(30) Foreign Application Priority Data
Jan. 29, 2013    (DE) .......................... 10 2013 100 856

(51) Int. Cl.
| | |
|---|---|
| B01D 53/56 | (2006.01) |
| B01D 53/58 | (2006.01) |
| B01D 53/62 | (2006.01) |
| B01D 53/72 | (2006.01) |
| F28D 17/00 | (2006.01) |
| F28D 19/00 | (2006.01) |
| B01D 53/86 | (2006.01) |
| B01D 53/34 | (2006.01) |
| B01D 53/38 | (2006.01) |
| F23G 7/06 | (2006.01) |
| F01N 3/20 | (2006.01) |

(52) U.S. Cl.
CPC ............ B01D 53/869 (2013.01); B01D 53/343 (2013.01); B01D 53/38 (2013.01); B01D 53/8625 (2013.01); F23G 7/068 (2013.01); F28D 17/00 (2013.01); F01N 3/2066 (2013.01); B01D 2251/206 (2013.01); B01D 2251/2062 (2013.01); B01D 2251/2067 (2013.01); B01D 2257/402 (2013.01); B01D 2257/406 (2013.01); B01D 2257/502 (2013.01); B01D 2257/708 (2013.01); B01D 2258/0233 (2013.01); B01D 2259/655 (2013.01)
USPC ..................... 432/237; 423/239.1; 423/245.3; 423/247; 422/168; 422/169; 422/170; 422/171; 422/175

(58) Field of Classification Search
USPC ........................... 423/245.3, 247, 237, 239.1; 422/168–171, 175
See application file for complete search history.

(56) References Cited

U.S. PATENT DOCUMENTS

2003/0202928 A1* 10/2003 Gravel ....................... 423/245.3

FOREIGN PATENT DOCUMENTS

| DE | 19905733 B4 | 3/2005 |
|---|---|---|
| EP | 0472605 B1 | 12/1993 |

*Primary Examiner* — Timothy Vanoy
(74) *Attorney, Agent, or Firm* — Morgan, Lewis & Bockius, LLP

(57) ABSTRACT

For the purification of waste gas containing nitrogen oxides in combination with CO, VOCs or nitrous oxide, in particular waste gas resulting from the production of cement clinker, nitric acid, adipic acid, fertilizers and uranium trioxide, a regenerative thermal post-combustion system with at least two regenerators (A, B) is used by means of which the CO, VOCs and nitrous oxide are thermally purified in the combustion chamber (1) at a temperature of 800 to 1000° C. and the nitrogen oxides are thermally reduced with the SCR catalyst (6) by adding a nitrogen-hydrogen compound, wherein the waste gas already thermally purified is removed from the respective two-part regenerator (A or B) at a suitable place at a temperature of approx. 300° C., guided via the SCR catalyst (6) in a constant direction of flow and subsequently fed back to the remaining section (A', B') of the regenerator (A or B).

15 Claims, 4 Drawing Sheets

PROCESS AND DEVICE FOR THE PURIFICATION OF WASTE GASES

CROSS-REFERENCE TO RELATED APPLICATIONS

Figure 1:
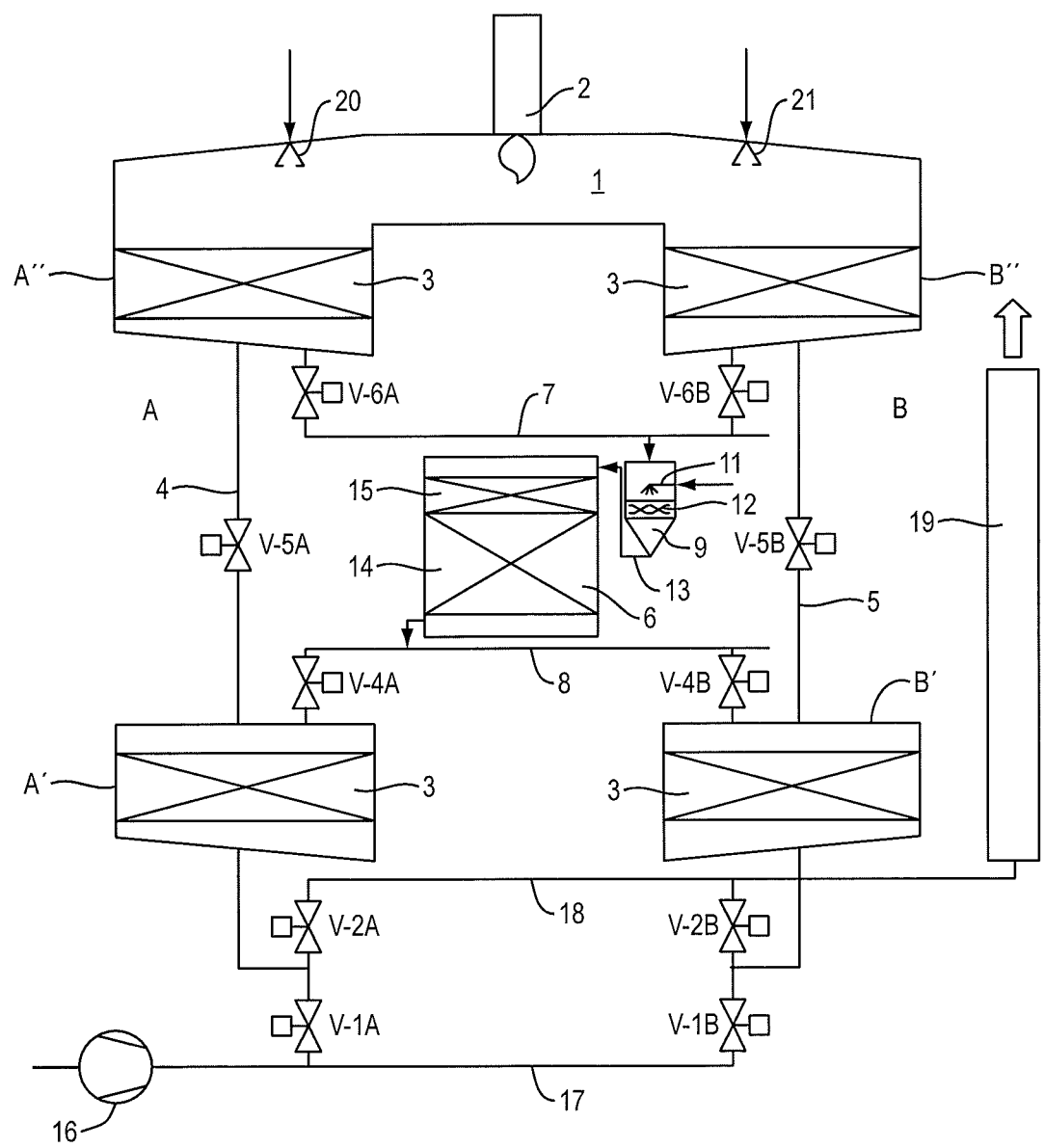

The present application claims priority to German Patent Application No. 10 2013 100 856.9, filed on Jan. 29, 2013, the entire content of which is incorporated herein by reference.

The invention relates to a process according to the preamble of claim 1. It further relates to a device for carrying out the process as well as the use of the device.

The combination of a regenerative thermal post-combustion system with a selective catalytic reduction (SCR) is known from DE 19905733 B4. In this process, a SCR catalyst material is each disposed on the regenerative heat exchanger materials, thereby achieving a thorough catalytic denitrification with high thermal efficiency when a reducing agent is added at the inlet of the regenerator. However, this process does not allow for a simultaneous purification of organic components, since the temperature above the catalyst is insufficient for the thermal oxidation of organic pollutants.

A process for the purification of waste gases according to the preamble of claim 1 in which the regenerators are vertically divided into three parts is known from EP 472 605 B1 (FIG. 4). First, the waste gas flows through the lower low-temperature section of the regenerator and then through the central SCR catalyst, in which ammonia is absorbed from the waste gas. Subsequently, the waste gas is heated to 800° C. in the upper high-temperature section of the regenerator, with the organic substances being thermally combusted in the adjacent combustion chamber. The waste gas prepurified in this way then flows through a second high-temperature regenerator and conveys the heat to its heat-accumulator bodies. Subsequently, nitrogen oxides ($NO_X$) with the absorbed ammonia are reduced on the catalyst layer at a temperature of approx. 430 to 230° C.

A drawback of this process is that it leads to a highly fluctuating temperature profile above the SCR catalyst in the direction of flow as in the heat exchanger, which still changes with the cycle time. For process-related reasons, it is impossible to operate the SCR catalyst throughout its total volume at its optimum temperature. In addition, the permanent change of temperature implies high mechanical stress on the SCR catalyst.

A further drawback is that heat is released if $NO_X$ is reduced to nitrogen ($N_2$). In high $NO_X$ concentrations, the heat released alone limits the maximum $NO_X$ inlet concentration, because otherwise the SCR catalyst would be subjected to rapid thermal aging caused by overheating. In the event that a temperature profile and its fluctuations over the length of the SCR catalyst must also be taken into account, the maximum $NO_X$ inlet concentration decreases dramatically.

A further major drawback is that, in the known process with three regenerators, at least three grids per regenerator are necessary for structural reasons if a homogeneous extruded material or corrugated SCR catalysts made of a relatively soft material are to be used instead of the significantly more expensive ceramic heat exchanger honeycombs coated with a SCR-catalytically active washcoat.

In addition, a catalyst must be provided in sufficient quantity in each regenerator, hence twice the quantity of catalysts in case of a system with two regenerators and three times the quantity of catalysts in case of a system with three regenerators compared to a single SCR system.

On the one hand, it is therefore the object of the invention to exploit the entire energy content from the thermal oxidation or post-combustion of organic components as well as carbon monoxide (CO) and/or the thermal reduction of nitrous oxide ($N_2O$) to nitrogen ($N_2$) in a regenerative thermal process—if possible without any external energy supply—by the increase in temperature produced by the reaction and to also use the latter for the denitrification by means of selective catalytic reduction, and, on the other hand, to provide a possibility to operate the SCR catalyst throughout its total volume at its optimum working temperature without supplying energy separately.

According to the invention, this is achieved by the process characterized in claim 1. Preferred embodiments of the process according to the invention are described in claims 2 to 9. Claim 10, which relates to a preferred device for carrying out the process according to the invention, is further developed by the measures of claims 11 to 14. Claim 15 relates to preferred uses of the device according to the invention.

According to the invention, the waste gas containing thermally purifiable compounds oxidizable with atmospheric oxygen as well as nitrogen oxides and/or compounds forming nitrogen oxides during the thermal purification are purified in a thermal post-combustion system. The oxidizable, thermally purifiable compounds are, in particular, volatile organic compounds (VOCs), carbon monoxide, ammonia and nitrous oxide, wherein ammonia ($NH_3$) is reduced to nitrogen ($N_2$), $NO_X$ and water and wherein nitrous oxide ($N_2O$) is reduced to $N_2$ and $O_2$ and oxidized to $NO_X$. In addition to nitrous oxide, nitrogen oxides can, in particular, be formed thermally at temperatures above 1100° C. (as, for example, in the burner flame) or by means of nitrogen-containing organic compounds, for example amines, nitriles or cyanides, during the thermal purification, thus without the use of a catalyst.

The post-combustion system has at least two regenerators filled with heat-accumulator bodies and connected to a common combustion chamber. The waste gas to be purified is alternately supplied to a raw gas inlet regenerator, the heat-accumulator bodies of which have been preheated, and the thermally purified waste gas emerging from the combustion chamber to a clean gas outlet regenerator for the heating of its heat-accumulator bodies and the SCR reaction of the nitrogen oxides with nitrogen by means of a reducing agent.

Irrespective of the raw gas temperature, no additional energy has to be spent in order to reach the required temperature for the SCR reaction.

According to the invention, the at least two regenerators of the post-combustion system are each divided into two parts in the direction of flow, namely into a first section of the regenerator facing away from the combustion chamber and a second section of the regenerator facing the combustion chamber. The at least two regenerators have a common SCR catalyst, wherein the waste gas thermally purified in the combustion chamber reaches a temperature of approx. 300° C. required for the SCR reaction after having cooled down in the section of the clean gas outlet regenerator adjacent to the combustion chamber and, mixed with the reducing agent, is supplied to the common catalyst for forming clean gas.

The raw gas obtained by means of the SCR catalyst conveys its heat to the heat-accumulator bodies of the second section of the clean gas outlet regenerator facing away from the combustion chamber and is then directed to the outside.

According to the process of the invention with the advantage of a constant flow through the SCR catalyst at an optimum catalyst temperature, it is also possible to use extruded SCR catalysts, for example based on vanadium pentoxide ($V_2O_5$), tungsten trioxide ($WO_3$) and/or titanium dioxide (TiO$_2$), which are little resistant to mechanical stress and temperature changes, but which, on the other hand, are less expensive.

Irrespective of the quantity of regenerators, the process according to the invention can be carried out with only one SCR catalyst, the through-flow of which is always in the same direction independent of the cycle of the thermal post-combustion system.

In order to reach the temperature required for the SCR reaction, no additional energy has to be spent for the SCR reaction, because the waste gas in the clean gas outlet regenerator can be removed at the section facing the combustion chamber, thus at a suitable place. This place is selected such that, after flowing through the section of the clean gas outlet regenerator adjacent to the combustion chamber, the waste gas purified in the combustion chamber at a temperature of preferably at least 800° C. has cooled down in such a manner that the temperature required for the SCR reaction is adjusted, wherein the temperature is preferably 200 to 400° C., in particular 250 to 350° C., and particularly preferably 280 to 320° C.

In order to ensure the selectivity of the SCR catalyst and minimize the aging of a SCR catalyst, but also to prevent the oxidation of SO$_2$ to SO$_3$, such defined window of working temperature has to be selected.

By feeding a reducing agent into the combustion chamber, the nitrogen oxides in the combustion chamber can be pre-denitrified thermally, thus not catalytically, by reducing them to nitrogen.

For reducing the nitrogen oxides in the combustion chamber, a nitrogen-hydrogen compound is preferably used as an aqueous solution. Ammonia, urea or carbamic acid can, for example, be used as a nitrogen-hydrogen compound.

In order to reduce the reaction temperature required for the thermal denitrification in the combustion chamber, additives, for example organic compounds such as alcohols, can be added to the nitrogen-hydrogen compound. For an optimum distribution of the aqueous solution of the nitrogen-hydrogen compound in the combustion chamber, two-fluid nozzles or ultrasonic atomizers can be provided, each having a constant or pulsating pump pre-pressure.

By feeding the reducing agent into the combustion chamber, approximately 50% of the nitrogen oxide load of the raw gas is typically removed; a possible ammonia slip during the thermal NO$_X$ reduction in the combustion chamber is used by the adjacent SCR catalyst as an additional reducing agent so that, according to the invention, an ammonia emission and a simultaneous reduction of the reducing agent requirement does not occur during the SCR reaction. As a reducing agent, a reducing agent containing VOCs can also be inserted into the combustion chamber, for example waste water from the photographic industry or chemical industry, which, in addition to ammonia, contains considerable amounts of organic solvents.

For the SCR reaction, the nitrogen-hydrogen compound, for example ammonia as a reducing agent, is supplied either as an aqueous solution or in gaseous form via a single-stage or double-stage mixing device to the second section of the clean gas outlet regenerator facing the combustion chamber directly upstream of the SCR catalyst.

The heat-accumulator bodies of the regenerative thermal post-combustion system preferably consist of extruded, prism-shaped ceramic heat-accumulator bodies having a plurality of gas passage channels running in the direction of gas flow as described, for example, in EP 472 605 B1. The SCR catalyst can also consist of such extruded, prism-shaped ceramic heat-accumulator bodies made of SCR catalyst material and having gas passage channels running in the direction of gas flow.

Before being mixed with the reducing agent, the thermally purified waste gas preferably flows through ceramic bulk bed for the purpose of homogenizing the temperature of the waste gas before it enters the SCR catalyst. The ceramic packaging material consists of preferably saddle-shaped or ring-shaped ceramic molded bodies. It distributes the added reducing agent over the cross sectional area of the SCR catalyst and likewise reduces the temperature fluctuations at the inlet of the SCR catalyst.

According to the invention, the waste gas is thus alternately supplied in cycles to at least one raw gas inlet regenerator, the heat-accumulator bodies of which have been preheated. The waste gas purified in this way is supplied to the combustion chamber, which has a high temperature of more than 800° C., in particular 850 to 1000° C. At this high temperature, the VOCs are combusted by the atmospheric oxygen in the waste gas and/or nitrous oxide is thermally converted into nitrogen. When flowing through the section of the clean gas outlet regenerator facing the combustion chamber, the resulting heat is conveyed to this section. By discharging the waste gas from the section of the two-part clean gas outlet regenerator facing the combustion chamber, it is possible to guide the waste gas via the SCR catalyst in all cycles in the same direction. After the distribution of flow and homogenization of temperature, the waste gas mixed with the reducing agent is supplied over the cycle through the ceramic bulk bed to the SCR catalyst at an optimum working temperature of approx. 300° C. The clean gas, thus the waste gas also purified by means of the SCR catalyst, conveys the remaining heat to the section of the two-part clean gas outlet regenerator facing away from the combustion chamber so that the heat resulting from the SCR reaction can be used as well.

The residence time of the waste gas in the combustion chamber is preferably 0.5 to 3 seconds, in particular 0.7 to 1.5 seconds, for example at a temperature of 800 to 850° C., if no thermal reduction is carried out with a reducing agent. In comparison, in case of a thermal SNCR reduction using a reducing agent, the residence time is preferably 1 to 4 seconds, in particular 1.5 to 2 seconds, at a combustion chamber temperature of more than 850° C., in particular 900 to 950° C. When nitrous oxide is thermally decomposed, the residence time is preferably 1 to 3 seconds, in particular 1.5 to 2 seconds, at a combustion chamber temperature of preferably 900 to 1000° C., in particular 950 to 970° C.

In order to remove residual waste gas contained in the raw gas inlet regenerator, each raw gas inlet regenerator is preferably purged for one cycle with clean gas from a further two-part regenerator before the direction of waste gas flow changes. Regarding VOCs or carbon monoxide, a purification efficiency of more than 99.5% can be achieved.

Instead of two or three regenerators, a plurality of regenerator pairs configured according to the invention is provided in case of higher waste gas flow rates. This makes it possible to limit the size of the individual regenerators to transportable dimensions. In addition, the alternating thermal stress load of the SCR catalyst is reduced by the sequential circuit of the regenerators. Compared to a system with three regenerators, the alternating load for the SCR catalyst is, for example, only 50% in case of a system with five regenerators and only 33% in case of a system with seven regenerators.

In the device for carrying out the process according to the invention, at least two regenerators connected to a common combustion chamber are preferably arranged parallel to each other. They each have two sections preferably arranged vertically on top of one another and filled with heat-accumulator bodies. A mounting with the SCR catalyst common to the at least two regenerators is laterally attached to the sections.

For connecting the catalyst to the lower section and the upper section of the at least two regenerators, the mounting has shut-off valves, preferably poppet valves, which are arranged in such a manner that the flow can either pass or by-pass, i.e. not pass, the SCR catalyst.

The invention is generally suited for the purification of waste gas containing thermally purifiable compounds oxidizable with the atmospheric oxygen in the waste gas as well as nitrogen oxides and/or compounds forming nitrogen oxides during the thermal purification in the combustion chamber of the thermal post-combustion system.

Therefore, the process according to the invention and the device according to the invention are particularly suited for the purification of waste gases resulting from the production of cement clinker, nitric acid, adipic acid and fertilizers. In addition, the process according to the invention and/or the device according to the invention are suited for the purification of waste gases resulting from the production of uranium trioxide, which is obtained by heating ammonium diuranate (yellow cake) in an oxygen atmosphere.

With respect to a device having five regenerators with purging option, the cyclic sequential circuit, i.e. the schematic circuit diagram of the shut-off valves of the regenerators, is depicted in the table below by way of example, with the numbering of the shut-off valves corresponding to FIG. 3 of the drawing and the regenerators being designated A to E accordingly. "0" designates a closed shut-off valve and "1" an open shut-off valve.

| step | valve position: 0 = closed, 1 = open | | | | | | | | | |
|---|---|---|---|---|---|---|---|---|---|---|
|  | 1 | 2 | 3 | 4 | 5 | 6 | 7 | 8 | 9 | 10 |
| step length (sec) | 60 | 3 | 60 | 3 | 60 | 3 | 60 | 3 | 60 | 3 |
| raw gas mode | A + B | A + B | B + C | B + C | C + D | C + D | D + E | D + E | E + A | E + A |
| clean gas mode | C + D | D + E | D + E | E + A | E + A | A + B | A + B | B + C | B + C | C + D |
| purging mode | E | — | A | — | B | — | C | — | D | — |
| V-1A | 1 | 1 | 0 | 0 | 0 | 0 | 0 | 0 | 1 | 1 |
| V-2A | 0 | 0 | 0 | 1 | 1 | 1 | 1 | 0 | 0 | 0 |
| V-3A | 0 | 0 | 1 | 0 | 0 | 0 | 0 | 0 | 0 | 0 |
| V-4A | 0 | 0 | 0 | 0 | 1 | 1 | 1 | 1 | 0 | 0 |
| V-5A | 1 | 1 | 1 | 0 | 0 | 0 | 0 | 0 | 1 | 1 |
| V-6A | 0 | 0 | 0 | 1 | 1 | 1 | 1 | 1 | 0 | 0 |
| V-1B | 1 | 1 | 1 | 1 | 0 | 0 | 0 | 0 | 0 | 0 |
| V-2B | 0 | 0 | 0 | 0 | 0 | 1 | 1 | 1 | 1 | 0 |
| V-3B | 0 | 0 | 0 | 0 | 1 | 0 | 0 | 0 | 0 | 0 |
| V-4B | 0 | 0 | 0 | 0 | 0 | 0 | 1 | 1 | 1 | 1 |
| V-5B | 1 | 1 | 1 | 1 | 1 | 1 | 0 | 0 | 0 | 0 |
| V-6B | 0 | 0 | 0 | 0 | 0 | 0 | 1 | 1 | 1 | 1 |
| V-1C | 0 | 0 | 1 | 1 | 1 | 1 | 0 | 0 | 0 | 0 |
| V-2C | 1 | 0 | 0 | 0 | 0 | 0 | 0 | 1 | 1 | 1 |
| V-3C | 0 | 0 | 0 | 0 | 0 | 1 | 0 | 0 | 0 | 0 |
| V-4C | 1 | 1 | 0 | 0 | 0 | 0 | 0 | 0 | 1 | 1 |
| V-5C | 0 | 0 | 1 | 1 | 1 | 1 | 1 | 1 | 0 | 0 |
| V-6C | 1 | 1 | 0 | 0 | 0 | 0 | 0 | 0 | 1 | 1 |
| V-1D | 0 | 0 | 0 | 0 | 1 | 1 | 1 | 1 | 0 | 0 |
| V-2D | 1 | 1 | 1 | 0 | 0 | 0 | 0 | 0 | 0 | 1 |
| V-3D | 0 | 0 | 0 | 0 | 0 | 0 | 0 | 0 | 1 | 0 |
| V-4D | 1 | 1 | 1 | 1 | 0 | 0 | 0 | 0 | 0 | 0 |

-continued

| | | | | | | | | | | |
|---|---|---|---|---|---|---|---|---|---|---|
| V-5D | 0 | 0 | 0 | 0 | 1 | 1 | 1 | 1 | 1 | 1 |
| V-6D | 1 | 1 | 1 | 1 | 0 | 0 | 0 | 0 | 0 | 0 |
| V-1E | 0 | 0 | 0 | 0 | 0 | 0 | 1 | 1 | 1 | 1 |
| V-2E | 0 | 1 | 1 | 1 | 1 | 0 | 0 | 0 | 0 | 0 |
| V-3E | 1 | 0 | 0 | 0 | 0 | 0 | 0 | 0 | 0 | 0 |
| V-4E | 0 | 0 | 1 | 1 | 1 | 1 | 0 | 0 | 0 | 0 |
| V-5E | 1 | 1 | 0 | 0 | 0 | 0 | 1 | 1 | 1 | 1 |
| V-6E | 0 | 0 | 1 | 1 | 1 | 1 | 0 | 0 | 0 | 0 |

EXAMPLE 1

Production of Cement Clinker

The production of cement clinker is an energy-intensive process, which is why the waste gas flow of the rotary kiln is used for preheating the raw meal in order to exploit as much waste heat as possible during the process. In modern cement plants, the waste heat of the clinker cooler is used as well. Nevertheless, the waste air flow of some 100.000 Nm³/h has a temperature of 130 to 200° C., which reflects the demand for thermal energy of the cement plant and which is why secondary fuels as well as excavated soil with a high content of hydrocarbon are processed together with the raw meal. Due to evaporation and partial pyrolysis, the hydrocarbons (VOCs) as well as additionally formed carbon monoxide and $NO_X$ do not find their way into the hot rotary kiln with the reverse waste gas flow but are transported in large part directly to the waste gas. The system according to the invention ensures a reliable and efficient purification of this wide range of pollutants and enables the use of larger amounts of secondary raw materials and secondary fuels both in terms of quality and quantity without having any negative impact on the environment.

Waste gas of a cement clinker kiln in interconnected operation

| | |
|---|---|
| Volume flow | 200.000 Nm³/h |
| Temperature | 150° C. |
| VOC | 600 mg/Nm³ dry based on 10% O2 |
| CO | 5000 mg/Nm³ dry based on 10% O2 |
| $NO_x$ | 800 mg/Nm³ dry based on 10% O2 |
| Dust | 2-5 mg/Nm³ after fabric filter |

With the system according to the invention (5-bed variant), the energy content of the waste gas is used in the form of the pollutants in order to purify VOCs, CO and $NO_X$ in autothermal operation.

For this purpose, the regenerative heat exchanger is used for preheating the waste gas to a temperature of >800° C., as a result of which sufficient energy is released by oxidation of CO and VOCs in order to maintain this temperature.

The purification of CO and TOO is 99.5%.

Waste gas downstream of the combustion chamber (inlet SCR catalyst)

| Temperature 320° C. | |
|---|---|
| CO | 25 mg/Nm³ |
| TOC | 3 mg/Nm³ |
| $NO_x$ | 820 mg/Nm³ |

Cleaned waste gas downstream of the SCR catalyst (stack)

| Temperature 200° C. | |
|---|---|
| CO | 30 mg/Nm³ |
| TOC | 5 mg/Nm³ |
| $NO_x$ | 150 mg/Nm³ |
| NH3 | 5 mg/Nm³ |

The consumption of reducing agent at the SCR stage is 65 kg/h $NH_3$ (100%). The reasons why it is so low is that existing $NO_2$ is likewise thermally converted into NO by the process according to the invention and the associated short-time heating of the waste gas to a temperature of >800° C. (equilibrium of $NO_X$ on the side of NO) followed by an equally rapid cooling.

As a result, the standard limit values according to TA Luft (Technical Instructions on Air Quality Control) can economically complied with also for this application.

EXAMPLE 2

Production of Ammonia

For the production of fertilizers as well as chemicals such as ammonium nitrate, caprolactam, adipic acid, dinitrotoluene and nitrobenzene, nitric acid produced from ammonia is used at the beginning. As a by-product, the greenhouse gas nitrous oxide ($N_2O$) is released, which has a global warming potential being 320 times as high as $CO_2$ and is thus catalytically purified frequently despite high investment and operating costs, because a partial compensation of these costs is currently still possible due to $CO_2$ certificate trading.

The process according to the invention enables a simultaneous removal of nitrous oxide, VOCs and $NO_X$ at significantly lower costs.

For the production of 560 to/d ammonium nitrate, 7700 kg/h ammonia is required. The corresponding tail gas of 70.000 Nm$^3$/h contains 3 g/Nm$^3$ N$_2$O. If a catalyst is used for the purification of N$_2$O, the purification efficiency is clearly below 90% at significant higher overall costs due to the rapid contamination of the catalyst (1 to 3 production cycles).

With the system according to the invention, nitrous oxide is thermally decomposed into N$_2$ (>95% purification). The nitrogen oxides produced by a side reaction from <14 mol-% of N$_2$O are purified together with the nitrogen oxides already contained in the waste gas by means of the integrated SCR reactor, without the waste gas having to be heated a second time. For this reason, the operating costs can be reduced to less than half the amount compared to the purely catalytic variant.

At the same time, environmental pollution (VOCs and NO$_X$) is reduced by 95% (only half the emission of the purely catalytic variant) with the process according to the invention. In addition, the nitrogen oxides are reduced and possibly existing emissions of methane from the process are purified and used energetically.

By combining a SCR with a thermal SNCR, thus non-catalytic denitrification, extremely high purification efficiency can be achieved. Since the consumption of reducing agent of the thermal reduction is approximately twice as high as that for the SCR, a SCR catalyst can primarily be used for the reduction of NO$_X$ if the SCR catalyst is fresh. In case of ageing or partial contamination of the SCR catalyst, the thermal denitrification can be used additionally in order to keep the clean gas concentration low and stable.

Figure 2A:
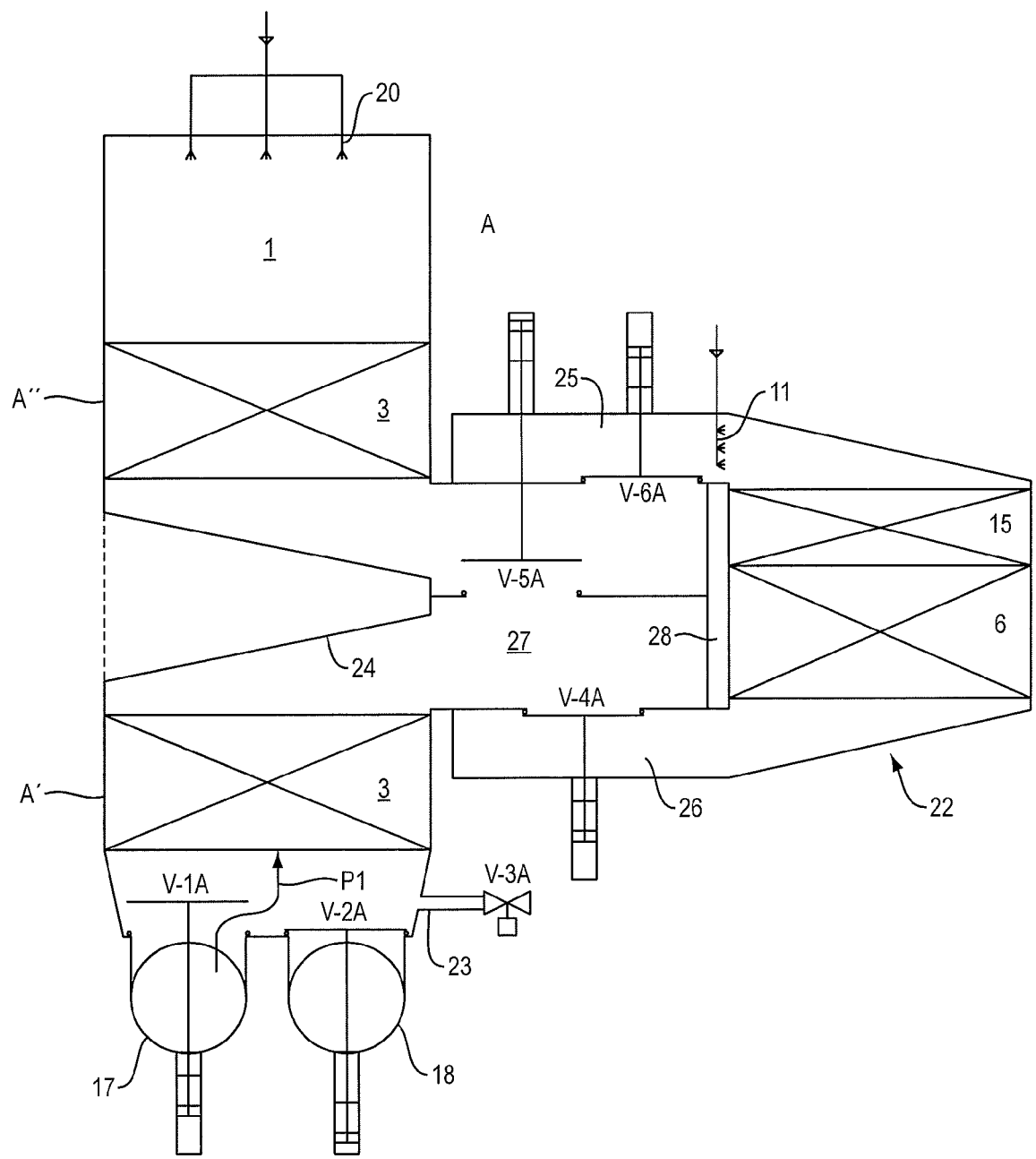
Figure 2B:
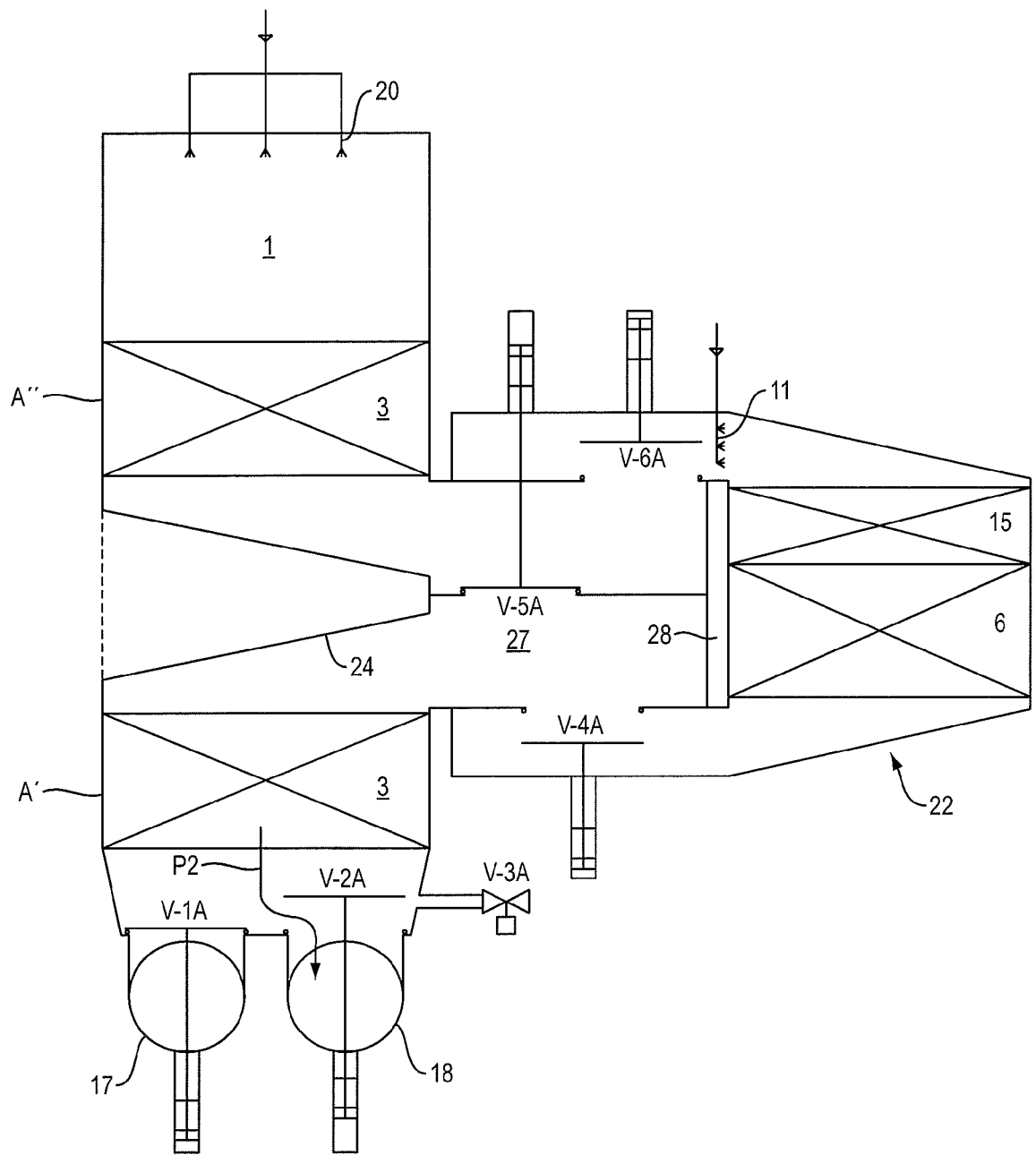
Figure 3:
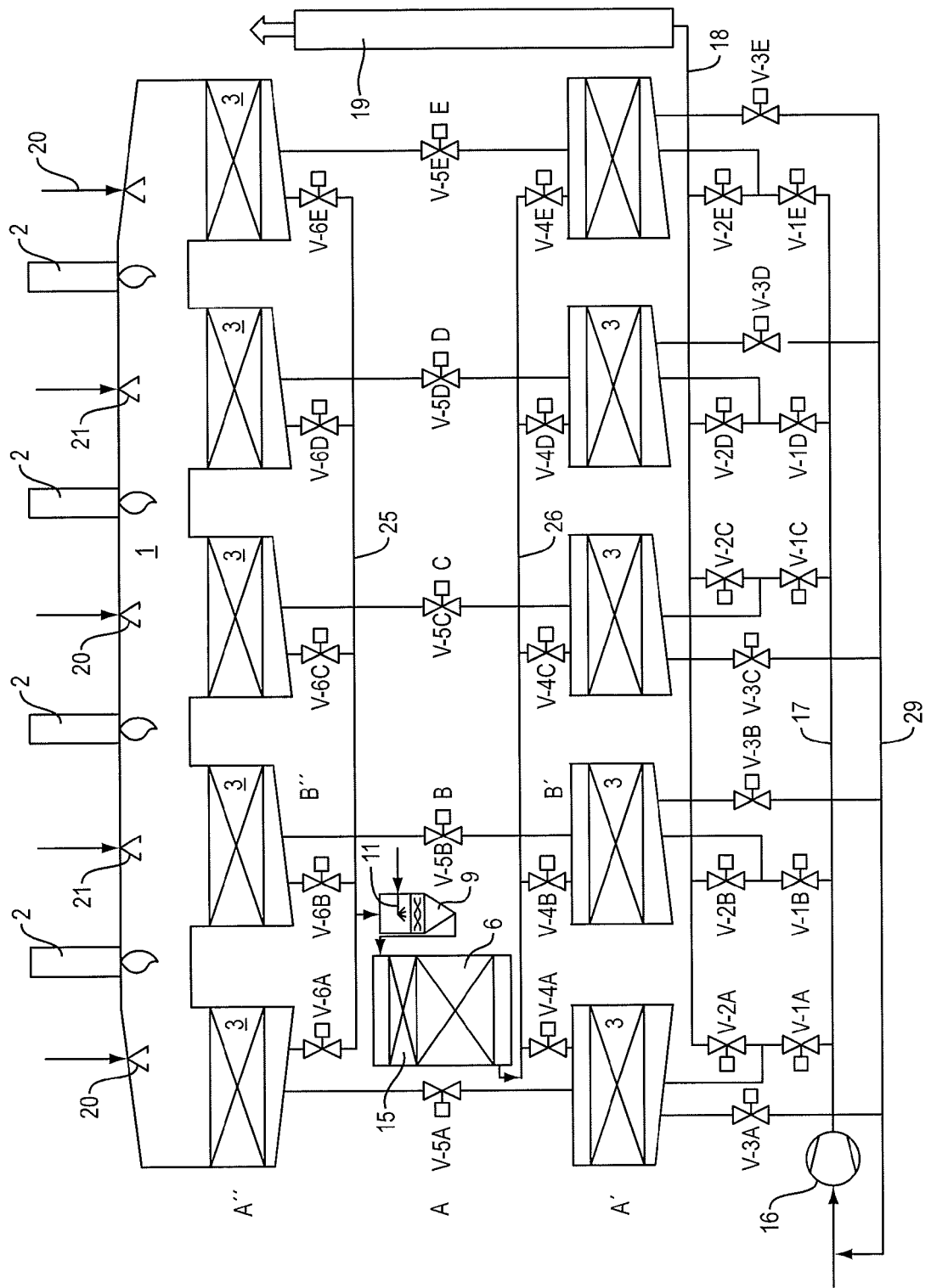

The invention will be described in more detail below by way of example with reference to the enclosed drawings, in which:

FIG. 1 shows a schematic view of a waste gas purification device with two reactors;

FIGS. 2a and 2b each show schematically a cross section through a regenerator as a raw gas inlet regenerator and a clean gas outlet regenerator respectively; and FIG. 3 shows a schematic view of a waste gas purification device with five generators.

According to FIG. 1, the regenerative thermal post-combustion device has two regenerators A and B connected to a burner 2 or an electrical heating by means of a common combustion chamber 1. In the combustion chamber 1, in which the temperature is, for example, 900° C., the waste gas is thermally purified.

The regenerators A and B are each divided into two parts in the direction of flow. That is to say they each consist of a lower section A' and B' respectively facing away from the combustion chamber 1 and an upper section A" and B" respectively facing the combustion chamber 1. The sections A', A", B' and B" are each filled with heat-accumulator bodies 3.

The two sections A', A" and B', B" of each regenerator A and B are connected to each other by means of a duct 4 and 5 respectively, each being provided with a shut-off valve V-5A and V-5B.

The two regenerators A and B have a common SCR catalyst 6.

For this purpose, the upper sections A" and B" are connected at the lower ends thereof to a duct 7 via shut-off valves V-6A and V-6B, and the lower sections A' and B' are connected at the upper ends thereof to a duct 8 via shut-off valves V-4A and V-5B.

The upper duct 7, via which the waste gas thermally purified in the combustion chamber 1 is supplied depending on the switching of the shut-off valves V-6A and V-6B respectively, is connected to a chamber 9 having, for example, a grate with nozzles 11 for supplying a nitrogen-hydrogen compound as a reducing agent for the SCR reduction with the catalyst 6.

The nozzles 11 are arranged in the chamber 9 upstream of a mixer 12, for example in the form of baffles. A duct 13 runs from the mixer 12 to the upper end of a chamber 14, in which the SCR catalyst 6 is disposed.

Between the place at which the duct 13 runs into the 14 and the catalyst 6, a ceramic packaging material 15 consisting, for example, of saddles is provided, which serves the purpose of additionally mixing the reducing agent with the waste gas thermally purified in the combustion chamber 1 as well as homogenizing the temperature of the waste gas entering the catalyst 6.

The clean gas produced after passing the SCR catalyst 6 is supplied from the chamber 14 via a duct 8 to the upper end of the lower sections A' and B' of the regenerators A and B switched to the "clean gas outlet" mode respectively.

The raw gas is supplied by a fan 16 via a raw gas duct 17, to which the two regenerators A and B are connected by means of shut-off valves V-1A and V-1B, namely at the lower end of the lower sections A' and B' respectively.

The clean gas is discharged to the outside via a clean gas duct 18 and the stack 19. For this purpose, the clean gas duct is connected to the lower end of the lower sections A' and B' of the two reactors A and B by means of shut-off valves V-2A and V-2B.

In the combustion chamber 1, nozzles 20, 21 are provided above the two regenerators A and B respectively, with said nozzles supplying a nitrogen-hydrogen compound as a reducing agent in order to pre-denitrify the nitrogen oxides in the combustion chamber at least partially, namely thermally, thus not catalytically.

The nozzle or the group of nozzles arranged above the raw gas tower is activated in each case in order to maximize the residence time for the non-catalytic reduction.

The regenerators A and B are operated alternately, i.e. either as a raw gas inlet regenerator, the heat-accumulator bodies 3 of which have been preheated in order to heat the raw gas entering the combustion chamber 1, or as a clean gas outlet regenerator, from which the clean gas emerges whilst conveying its heat to the heat-accumulator bodies of the regenerators A and B respectively for the next cycle.

That is to say the shut-off valve V-1A and the shut-off valve V-2B are opened and the shut-off valves V-2A and V-1B are closed in the event that the regenerator A forms the raw gas inlet regenerator and the regenerator B the clean gas outlet regenerator. In addition, the shut-off valve V-5A connecting the two sections A' and A" of the regenerator A via the duct 4 is opened, whereas the shut-off valves V-4A and V-6A connecting the regenerator A to the SCR catalyst 6 are closed.

In the regenerator B forming the clean gas outlet regenerator in this cycle, the shut-off valve V-5B connecting the two sections B" and B' via the duct 5 is closed in this case, whereas the shut-off valves V-6B and V-4B are opened so that, after part of its heat has been conveyed to the heat-accumulator bodies 3 of the section B" and after the nitrogen-hydrogen compound has been added by means of the nozzles 11, the waste gas which emerges from the section B" and which has been thermally prepurified and heated in the combustion chamber 1 is mixed in the static mixer 12 and 15 respectively and, purified by the SCR reaction with the catalyst 6, enters the lower section B' via the duct 8 in order to heat by its heat the heat-accumulator bodies 3 in the lower section B'.

The height of the upper section B" of the regenerator B in relation to the height of the lower section B' is selected such that the waste gas supplied from the section B" to the catalyst 6 has a temperature of, for example, 250 to 350° C., in particular 280 to 320° C., which is optimal for the SCR reaction.

Altogether, the overall height of the regenerator is selected such that the clean gas passes into the raw gas duct 18 with a temperature of, for example, 30 to 60° C. above the raw gas temperature and is directed to the outside through the stack 19. The same applies to the height of the sections A' and A" of the regenerator A and to all further parallel regenerators.

When, during the next cycle, the regenerator B forms the raw gas inlet regenerator and the regenerator A the clean gas outlet regenerator, the valves V-1A, V-2B, V-5A, V-6B and V-4B are closed and the valves V-2A, V-4A, V-6A and V-5B are opened.

In FIG. 2a and FIG. 2b, the regenerator A according to FIG. 1 is shown as a raw gas inlet regenerator (FIG. 2a) and a clean gas outlet regenerator (FIG. 2b) respectively. In FIG. 2a, the entering raw gas is illustrated by the arrow P1, and the emerging raw gas is marked by the arrow P2 in FIG. 2b.

As can be seen from FIGS. 2a and 2b, the catalyst 6, the packaging material 15, the nozzles 11 for supplying the nitrogen-hydrogen compound and the shut-off valves V-4A, V-5A and V-6A configured in the form of poppet valves are provided in a mounting 22 laterally on the regenerator A.

The shut-off valves V-1A and V-2A on the raw gas duct 17 and the clean gas duct 18 respectively are likewise configured in the form of poppet valves.

The second regenerator B (FIG. 1) is arranged behind the regenerator A and therefore not visible in FIGS. 2a and 2b. This arrangement also applies to further existing regenerators.

In contrast to FIG. 1, the lower section A' of the regenerator A and the lower section B', which is not visible in FIGS. 2a and 2b, each have at their lower ends a duct 23 with a shut-off valve V-3A for the extraction of remaining raw gas, which is displaced from above by clean waste gas from the combustion chamber and which is subsequently fed back to the raw gas as a branch stream of approx. 5 to 10%. The regenerator is purged each time after it has been used as a raw gas inlet regenerator and before it is used as a clean gas regenerator.

According to FIGS. 2a and 2b, between the two sections A' and A", the regenerator A has a baffle plate or a deflecting element 24 of that kind deflecting the waste gas flow between the sections A' and A" into the mounting 22.

The mounting 22 has an upper collecting duct 25 common to the two regenerators A and B, which serves to supply the waste gas thermally purified in the combustion chamber 1 from the upper section A" and B" respectively to the catalyst 6, as well as a common lower collecting duct 26 for the clean gas purified with the catalyst 6, which is supplied to the lower section A' and B' respectively of the regenerator A and B respectively.

Between the upper duct 25 and the lower duct 26 in the mounting 22, a separate space 27 for each regenerator A, B is provided, into which the raw gas and the clean gas of the respective regenerator A, B flows and from which the catalyst 6 is separated by means of a wall 28.

When the regenerator A (or B) forms the raw gas inlet regenerator according to FIG. 2a, the poppet valve V-5A of the regenerator A (and the poppet valve V-5B respectively of the regenerator B not shown in FIGS. 2a and 2b) is opened, whereas the poppet valves V-6A and V-4A (and V-6B and V-4B respectively) are closed to the collecting ducts 25 and 26.

However, when the regenerator A (or B) forms the clean gas outlet regenerator, according to FIG. 2b, the poppet valves V-4A and V-6A of the regenerator A (and the poppet valves V-4B and V-6B of the regenerator B) are opened, whereas the poppet valve V-5A (and V-5B respectively) is closed.

The device according to FIG. 3 has five regenerators A to E, all of which are configured in the same way as the regenerators A and B according to FIG. 1 and FIGS. 2a and 2b. That is to say all regenerators A to E, which are preferably arranged vertically adjacent to each other, have sections A', A", B', B" . . . filled with heat-accumulator bodies 3 as well as a common combustion chamber 1 and a common catalyst 6.

Preferably, the catalyst 6 is arranged in a lateral mounting which is attached laterally and configured according to FIGS. 2a and 2b.

The sections A', A", B', B" . . . of each regenerator A to E can be connected to each other by means of the shut-off valves V-5A to V-5E. The sections A', A", B', B" . . . can be connected to each other by means of the shut-off valves V-6A to V-6E and V-4A to V-4E via the catalyst 6 in the mounting 22.

The upper collecting duct 25 and the lower collecting duct 26 according to FIGS. 2a and 2b are shown schematically in FIG. 3.

In each case, one pair of the regenerators A to E is switched to the "raw gas inlet" mode, another pair of the regenerators A to E to the "clean gas outlet" mode, whereas the fifth regenerator A to E is provided for purging.

For this purpose, the regenerators A to E are connected with the lower ends of their lower sections A', B', . . . via shut-off valves V-3A (cf. FIGS. 2a and 2b) to V-3E to a purge duct 26 supplying the raw gas expelled from the regenerators A to E together with purified clean gas from the combustion chamber 1 to the raw gas duct 17 upstream of the fan 16.

The cyclic operating diagram of the device according to FIG. 3 having five regenerators A to E is illustrated above in the table of the description.

The invention claimed is:

1. Process for the purification of waste gas containing thermally purifiable compounds oxidizable with the oxygen in the waste gas as well as nitrogen oxides and/or compounds forming nitrogen oxides during the thermal purification in a post-combustion system having at least two regenerators (A, B . . . ) filled with heat-accumulator bodies (3) and connected to a common combustion chamber (1), wherein the waste gas is alternately supplied to a raw gas inlet regenerator (A or B), the heat-accumulator bodies (3) of which have been preheated, and the thermally purified waste gas emerging from the combustion chamber (1) is supplied to a clean gas outlet regenerator (B or A) for the heating of its heat-accumulator bodies (3) and the selective catalytic reduction of the nitrogen oxides to nitrogen by means of a reducing agent, characterized in that at least two regenerators (A, B . . . ) are each divided into two parts in the direction of flow, namely into a section of the regenerator (A', A"; B', B") facing away from the combustion chamber (1) and facing the combustion chamber (1) and that the at least two regenerators (A, B) have a common catalyst (6) for the selective catalytic reduction, wherein, after cooling down to the temperature required for the selective catalytic reduction in the section (A", B") of the clean gas outlet regenerator (A, B) adjacent to the combustion chamber (1) and mixing with the reducing agent, the waste gas thermally purified in the combustion chamber (1) is supplied to the common catalyst (6) for forming clean gas, which is directed to the outside after it has conveyed heat to the heat-accumulator bodies (3) of the section (A', B') of the clean gas outlet regenerator (A, B . . . ) facing away from the combustion chamber (1).

2. Process according to claim 1, characterized in that waste gas to be purified contains volatile organic compounds, carbon monoxide, ammonia and/or nitrous oxide as oxidizable, thermally purifiable compounds as well as ammonia, nitrous oxide and/or nitrogen-containing volatile organic compounds as compounds forming nitrogen oxides during the thermal purification.

3. Process according to claim 1, characterized in that the temperature required for the selective catalytic reduction is 200 to 400° C.

4. Process according to one of the preceding claims 1, 2 or 3, characterized in that the nitrogen oxides existing or being formed in the combustion chamber (1) can thermally be pre-denitrified by feeding a reducing agent into the combustion chamber (1).

5. Process according to claim 1, characterized in that the temperature in the combustion chamber (1) is at least 800° C. and, in case of thermal denitrification, at least 900° C.

6. Process according to claim 1, characterized in that, after having been mixed with the reducing agent, the thermally purified waste gas preferably flows through a ceramic packaging material (15) for homogenizing the temperature of the waste gas before it enters the catalyst (6).

7. Process according to claim 1, characterized in that a nitrogen-hydrogen compound is used for reducing the nitrogen oxides in the combustion chamber (1) and/or to nitrogen with the catalyst (6).

8. Process according to claim 1, characterized in that the residence time of the waste gas in the combustion chamber (1) is 0.3 to 1 seconds and, in case of thermal denitrification, 1 to 4 seconds.

9. Process according to claim 1, characterized in that a further regenerator (A to E) is provided for purging the raw gas inlet regenerator (A to E) with clean gas before the latter's passing to the clean gas outlet regenerator.

10. Device for carrying out the process according to claim 1, characterized by a post-combustion system with at least two regenerators (A, B) having a common combustion chamber (1) which each have two sections (A', A"; B', B") arranged on top of one another and filled with heat-accumulator bodies (3) and to which a common mounting (22) with the catalyst (6) for the selective catalytic reduction is laterally attached, wherein the mounting (22) has shut-off valves (V-4A, V-5A, V-6A; V-4B, V-5B, V-6B) for connecting the catalyst (6) to the lower section (A', B') and the upper section (A" and B"), with or without the flow passing the catalyst (6).

11. Device according to claim 10, characterized in that the mounting (22) has an upper collecting duct (25) common to the at least two regenerators (A, B) for supplying the thermally purified waste gas to the catalyst (6) and a lower collecting duct (26) common to the at least two regenerators (A, B) for the clean gas purified with the catalyst (6), a space (27) arranged between the upper duct (25) and the lower duct (26) for each regenerator (A, B) with the shut-off valves (V-4A, V-5A, V-6A) (V-4B, V-5B, V-6B) for connecting the upper collecting duct (25) to the lower collecting duct (26) via the catalyst (6) or for connecting the lower section (A', B') of the regenerator (A, B) to the upper section (A", B") thereof via the space (27).

12. Device according to claim 11, characterized in that the nozzles (11) for supplying the reducing agent for the selective catalytic reduction with the catalyst (6) are provided in the upper collecting duct (25).

13. Device according to claim 10, characterized in that, on the catalyst (6), a ceramic packaging material (15) is provided for homogenizing the temperature of the waste gas and mixing the latter with the reducing agent.

14. Device according to claim 10, characterized in that a plurality of pairs of regenerators (A to E) is provided, each having two sections (A', A", B', B") arranged on top of one another and filled with heat-accumulator bodies (3) and to which a common mounting (22) with the catalyst (6) for the selective catalytic reduction is laterally attached, wherein the mounting (22) contains shut-off valves (V-4A to V-4E, V-5A to V-5E, V-6A to V-6E) for connecting the upper collecting duct (25) to the lower collecting duct (26) via the catalyst (6) or the lower section (A', B') to the upper section (A", B", . . . ) of the regenerators (A to E).

15. Use of the device according to claim 10 for the purification of the waste gas resulting from the production of cement clinker, nitric acid, adipic acid, fertilizers and uranium trioxide.

\* \* \* \* \*